US010528280B1

(12) United States Patent
Sandvig et al.

(10) Patent No.: US 10,528,280 B1
(45) Date of Patent: Jan. 7, 2020

(54) TOMBSTONES FOR NO LONGER RELEVANT DEDUPLICATION ENTRIES

(71) Applicant: Pure Storage, Inc., Mountain View, CA (US)

(72) Inventors: Cary A. Sandvig, Palo Alto, CA (US); Constantine P. Sapuntzakis, Mountain View, CA (US); Feng Wang, Sunnyvale, CA (US)

(73) Assignee: Pure Storage, Inc., Mountain View, CA (US)

( * ) Notice: Subject to any disclaimer, the term of this patent is extended or adjusted under 35 U.S.C. 154(b) by 300 days.

(21) Appl. No.: 15/420,726

(22) Filed: Jan. 31, 2017

(51) Int. Cl.
 *G06F 12/00* (2006.01)
 *G06F 3/06* (2006.01)
 *G06F 12/02* (2006.01)

(52) U.S. Cl.
 CPC ............ *G06F 3/0641* (2013.01); *G06F 3/061* (2013.01); *G06F 3/0608* (2013.01); *G06F 3/0673* (2013.01); *G06F 12/0253* (2013.01); *G06F 2212/7205* (2013.01)

(58) Field of Classification Search
 CPC .... G06F 3/0641; G06F 12/0253; G06F 3/061; G06F 3/0608; G06F 3/0673; G06F 2212/7205
 See application file for complete search history.

(56) References Cited

U.S. PATENT DOCUMENTS

| 5,799,321 A | 8/1998 | Benson |
| 6,247,175 B1 | 6/2001 | Ledford et al. |
| 6,256,634 B1 | 7/2001 | Moshaiov et al. |
| 6,286,056 B1 | 9/2001 | Edgar et al. |
| 6,804,703 B1 | 10/2004 | Allen et al. |
| 6,954,881 B1 | 10/2005 | Flynn Jr. et al. |
| 7,139,907 B2 | 11/2006 | Bakke et al. |
| 7,272,674 B1 | 9/2007 | Nandi et al. |
| 7,313,636 B2 | 12/2007 | Qi |
| 7,577,802 B1 | 8/2009 | Parsons |

(Continued)

OTHER PUBLICATIONS

Ouyang, J. et al. (Mar. 1-5, 2014) "SDF: Software-Defined Flash for Web-Scale Internet Storage Systems", ASPLOS 2014, 14 pages.

(Continued)

*Primary Examiner* — Shawn X Gu
(74) *Attorney, Agent, or Firm* — Womble Bond Dickinson (US) LLP; Daniel E. Ovanezian

(57) ABSTRACT

An implementation of the disclosure provides a system comprising a storage array comprising a plurality of data blocks and a storage controller coupled to the storage array. The storage controller comprising a processing device to identify a canonical instance of a data block in a vector associated with a deduplication map. The vector represents a plurality of updates to the deduplication map over a determined time period. A deduplication reference representing duplicate data of the data block in the storage array is select from the deduplication map. The deduplication reference is remapped in the deduplication map to point to the canonical instance. Based on the remapping, an entry in the deduplication map for the deduplication reference is updated with a record. Responsive to detecting that the entry is in a location associated with an original entry of the data block in the deduplication map, delete the entry with the record.

17 Claims, 6 Drawing Sheets

(56) References Cited

U.S. PATENT DOCUMENTS

| | | | |
|---|---|---|---|
| 7,953,710 | B2 | 5/2011 | Novik et al. |
| 8,103,754 | B1 | 1/2012 | Luong et al. |
| 8,301,811 | B1 | 10/2012 | Wigmore et al. |
| 8,645,649 | B2 | 2/2014 | Kaiya et al. |
| 8,688,634 | B2 | 4/2014 | Beyer et al. |
| 9,063,937 | B2 | 6/2015 | McDowell et al. |
| 9,092,151 | B1 * | 7/2015 | Floyd .................. G06F 16/215 |
| 9,294,567 | B2 | 3/2016 | Hussain et al. |
| 9,430,412 | B2 | 8/2016 | Huang |
| 9,448,927 | B1 * | 9/2016 | Agarwala ........... G06F 12/0253 |
| 9,501,245 | B2 | 11/2016 | Hussain et al. |
| 9,565,269 | B2 | 2/2017 | Malwankar et al. |
| 2007/0299887 | A1 | 12/2007 | Novik et al. |
| 2008/0034167 | A1 | 2/2008 | Sharma et al. |
| 2014/0006348 | A1 | 1/2014 | Akinyemi |
| 2014/0025644 | A1 * | 1/2014 | Taylor .................... G06F 16/17 |
| | | | 707/690 |
| 2015/0019798 | A1 | 1/2015 | Huang |
| 2015/0268864 | A1 * | 9/2015 | Bernat ................. G06F 3/0604 |
| | | | 711/162 |
| 2017/0024166 | A1 | 1/2017 | Singh et al. |

OTHER PUBLICATIONS

Zhang, J. et al. (2016) "Application-Aware and Software-Defined Ssd Scheme for Tencent Large-Scale Storage System" 2016 IEEE 22nd International Conference on Parallel and Distributed Systems, 482-490.

"Open-Channel Solid State Drives NVMe Specification" (Apr. 2016), 24 pages.

* cited by examiner

US 10,528,280 B1

TOMBSTONES FOR NO LONGER RELEVANT DEDUPLICATION ENTRIES

TECHNICAL FIELD

The present disclosure is generally related to data deduplication, and more specifically, to tombstones for no longer relevant deduplication entries.

BACKGROUND

Data deduplication is a data optimization process to eliminate or remove redundant data to improve the utilization of storage resources. For example, during the data deduplication process, blocks of data may be processed and stored. When a subsequent block of data is received, the subsequent block of data may be compared with the previously stored block of data. If the subsequent block of data matches with the previously stored block of data, then the subsequent block of data may not be stored in the storage resource. Instead, a pointer to the previously stored block of data may replace the contents of the subsequent block of data.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
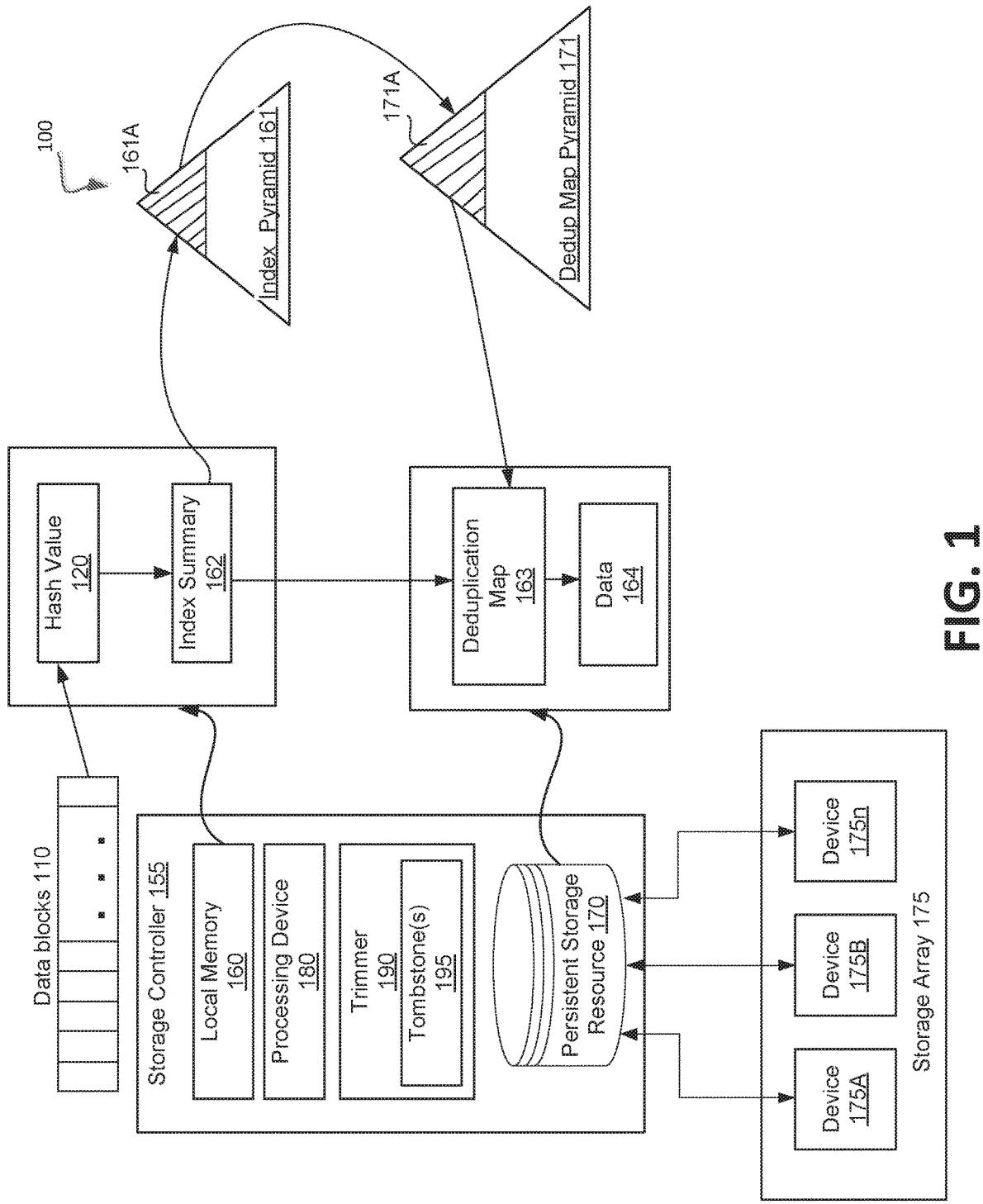
FIG. 1 illustrates an example system for data deduplication in accordance with some embodiments.

A data deduplication process may analyze data blocks to determine whether a duplicate or copy of the data block is currently stored at a storage system. The data deduplicaiton process may include, for example, an "inline" data deduplication process and a "background" data deduplication process. An inline data deduplication process may be performed as new data blocks are received and prior to storing the received data blocks in a storage resource. For example, a data block is received and analyzed before being stored in a storage resource. The inline deduplication process may determine whether a copy of the received data block is already stored in the storage resource before storing the received data block in the storage resource.

The background data deduplication process (which also may be referred to as a "background deduplication process" or "post-processing data deduplication") may occur after data blocks are stored in a storage system. For example, the background data deduplication process may scan a storage system including any storage resources (e.g., storage using solid-state non-volatile memory such as flash) to detect duplicate data blocks within the storage system, and preserve a single instance of the duplicated data block.

In some instances, the data deduplication process may select a data block (e.g., a particular instance of a string of bytes at a certain physical location on a storage resource) and use a hash function to generate a hash value based on that data block. The hash values may be compared with other hash values stored in a database. The database may include a deduplication map comprising a plurality of rows (e.g., deduplication entries). Each row identifies a mapping of a hash value to a currently stored data block in the storage system. In some instances, updates to the duplication map are eventually persisted (e.g., written) into a persistent container (which also may be referred to as a "vector" herein). The vector represents all of the updates to the deduplication map for a given time range. Each write to the back-end storage associated with the vector is given a unique, monotonic sequence that is reasonable proxy for a time the write occurred. A vector contains all changes in state for a range of sequences. Vectors are conceptually stacked one atop another in sequence order.

With respect to the data deduplication process, after the hash value for the data block is generated, the hash value is compared with hash values of other data blocks in the database. If the generated hash value matches with any of the hash values in the database, then the data block may be considered to be a copy or duplicate of an existing data block. In such cases, a pointer may be used to replace the duplicate contents of the data blocks in the storage system. For example, the pointer may reference a physical location of the already existing data block corresponding to the matching hash value in the database. In some instances, the "best" existing data block to the duplicate contents may be referred to as a "canonical" data block that references an earliest occurrence of the duplicate contents stored in a particular vector of the deduplication map.

As a result of the data deduplication process, references in storage system to the other data blocks with the matching hash values are updated (e.g., remapped) to point to the canonical data block. Although the physical locations of the other data blocks are no longer referenced, the deduplication entries of the other data blocks may still exist in the database. In some storage systems, a process (such as a garbage collection) may remove the no longer referenced data blocks. For example, the object of garbage collection is to delete unused (or "dead") data blocks stored in the storage system to reduce data fragmentation and improve system performance. Until the no longer referenced data blocks are removed, the data deduplication processes may still discover the deduplication entries associated with the data blocks in the database. In turn, this can adversely affect system performance when, for example, the data deduplication process is attempting to deduplicate future instances of the data block that are received because it considers more deduplication entries for the same hash value.

Aspects of the disclosure address the above-mentioned and other deficiencies by providing tombstones (e.g., a record) for no longer relevant deduplication entries that, for example, may still exist in the database. For example, the tombstone may be a data structure consisting of a row of data to be stored in a database table. When the data block is selected during the data deduplication process, a deduplication entry associated with the data block is updated with a new record or tombstone. The tombstone indicates that this deduplication entry is no longer referenced. The tombstones may evolve through the database in a process referred to as "flattening." In flattening, a determined range of vectors are occasionally merged. In this regard, the vectors are rewritten into a new (single) vector that represents a contiguous sequence range.

Once the tombstones through the flattening process have landed in the same vector (e.g., sequence range) as the original entry for the data block in the database, the deduplication entries associate with the tombstones can be dropped from the database. This allows the storage system to thin out the database in advance of a garbage collection process removing the dead data blocks. Thus, an advantage of using the tombstones is that the thinner the database can be made, the better it may perform when it is used in a data deduplication process for subsequently received data block. In that regard, rather than the tombstones persisting until they hit the bottom time range of the deduplication map, another advantage of the techniques disclosure herein is that the tombstones can be removed earlier because system can tell the sequence in which the original entry was created.

FIG. 1 illustrates an example system 100 for data deduplication in accordance with some embodiments. In some implementations, the system 100 may be in the exemplary form of a storage system that can perform any one or more of the methodologies discussed herein. As shown, the system 100 includes a storage controller 155 comprising a local memory 160, a persistent storage resource 170, a processing device 180, and a trimmer 190. Processing device 180 may execute the trimmer 190 to perform operations to provide tombstones 195 for trimming no longer relevant deduplication entries from the system 100. It may be noted the functionality attributed to a particular component can be performed by different or multiple components operating together. The storage controller 155 may be coupled directly to a client device (not shown), and storage controller 155 may be coupled remotely over a network to the client device.

Persistent storage resource 170 may correspond to a non-disk storage media, such as storage array 175. In some implementations, the storage array 175 includes storage devices 175A-n. A "storage device" as the term is used herein refers to any device configured to record data persistently. The term 'persistently' as used herein refers to a device's ability to maintain recorded data after loss of a power source. Examples of storage devices may include mechanical, spinning hard disk drives, solid-state drives (SSDs), flash memory based storage, any type of solid-state non-volatile memory, or any other type of non-mechanical storage device, and the like. Local memory 160 (also referred to as "cache" or cache memory" herein) may include a volatile memory, such as random access memory (RAM) (e.g., dynamic RAM (DRAM) or static RAM (SRAM) or on-chip cache RAM of processing device 180).

It will appreciate that the storage resource 170 and the components that are contained in system 100 (e.g., storage system) as described in the disclosure, are included for explanatory purposes and do not represent limitations as to the types of storage resources that may utilize benefits of methodologies disclosed herein. Alternatively, data (e.g., data 164) of the storage resource 170 within system 100 may be embodied as object storage, where data is managed as objects. Each object may include the data itself, a variable amount of metadata, and a globally unique identifier, where object storage can be implemented at multiple levels (e.g., device level, system level, interface level). In addition, storage within system 100 may be embodied as file storage in which data is stored in a hierarchical structure. Such data may be saved in files and folders, and presented to both the system storing it and the system retrieving it in the same format. Such data may be accessed using the Network File System ('NFS') protocol for Unix or Linux, Server Message Block ('SMB') protocol for Microsoft Windows, or in some other manner.

In one implementation, the storage controller 155 may receive data blocks 110 and store the data blocks 110 in the persistent storage resource 170. The storing of the data blocks 110 may occur after performing a data deduplication process. In the data deduplication process may use the index summary 162 and the deduplication map 163 to determine whether the persistent storage resource 170 currently stores data 164 that includes a copy of a received data block 110. The deduplication map 163 may store hash values for data blocks that are stored in the data 164 at the persistent storage resource 170. The index summary 162 may be used to identify a part of the hash values stored at the deduplication map 163. For example, with respect to an index pyramid 161 where a top portion 161A (e.g., shaded portion) of the index pyramid 161 represents data blocks (or corresponding index summary levels of the data blocks) that are more recently received when compared with the bottom portion. The index summary 162 may include partial hash values (also referred to as "hash value signatures" herein) for the data blocks more recently received by the storage controller 155. The deduplication map 163 may include complete hash values for some or all of the data blocks that are currently stored in the data 164 in the persistent storage resource 170.

In one implementation, a stream of data blocks 110 may be received from, for example, a client device (not shown). A transformation component (not shown) may use the stream of data blocks 110 in a hash function to generate one or more hash values 120. The hash function may transform the data block of an arbitrary size to data of a fixed size, such as 128-bit. In some implementations, the stream of data blocks 110 may be a series of data blocks that are to be stored at storage resources 170 managed by the storage controller 155. The transformation component may perform a transformation using for example, a hash function, on each data block of the stream of data blocks 110 to generate corresponding hash values 120 before determining whether to store the data block at the persistent storage resource 170. If the corresponding hash values matches previously stored hash values, the contents of the data blocks 110 may be a copy of contents of a previously received data blocks. Instead of storing the contents of the data blocks 110, a pointer to the previously received data blocks with the matching hash values may be used to replace the contents of the subsequent data blocks.

In one implementation, the resulting hash values 120 may be compared with other hash values stored in the index summary 162 to determine whether a copy of the data blocks 110 is currently stored in the persistent storage resource 170. In one implementation, if the hash values 120 are not found in index summary 162, the storage controller 155 determines the stream of data blocks 110 have not been previously stored and stores those data blocks 110 in persistent storage resource 170.

Index summary 162 (which may also be referred to as "summary tables" herein) may be a compact indexing structure to facilitate accelerated lookup of data 164 already stored in storage resource 170. An index summary 162 may include metadata, such as compressed hash values (e.g., signatures of hash values) and compressed pointers that point to a page in deduplication map 163. The deduplication map 163 is also part of the compact indexing structure and contains additional metadata, such as the uncompressed 128-bit hash values and the physical address of data 164 located in storage resource 170.

In some embodiments, the index summary 162 may correspond to the top portion 161A of index pyramid 161 and contain the index tables for the most recent data. In one embodiment, index pyramid 161 may contain multiple index tables ordered as different levels of index pyramid 161. Similarly, deduplication map pyramid 171 may include multiple deduplication tables ordered as different levels of deduplication map pyramid 171. In one embodiment, the content or order of index pyramid may be time-based. Data that is recent, for example recently stored or deduplicated, may have associated index levels that are placed on a top portion 161A of index pyramid 161. Index levels associated with stale or old data percolate to the bottom of index pyramid 161.

A deduplication map 163 may include one or more deduplication map levels 166. A deduplication map level 166 may refer to a data structure, such as a deduplication table with rows (also referred to as "deduplication entries" herein). The rows may define a value (also referred to as a "key" herein), such as a complete hash value (also referred to as a "hash value" herein), for a data block. In some embodiments, the rows may include a location of the data block, such as an address in the persistent storage resource 170, may be located in the key portion of a key-value pair. The deduplication map level 166 may be sorted by value (e.g., key) and held in local memory 160 or stored in pages of persistent storage resource 170 in some grouping, segmenting, or vectoring that orders and relates the portions of the pages of the deduplication map level 166 together in an efficient manner. In some implementations, a page may be a smallest unit of memory that may be programmed (e.g., written to) in the persistent storage resource 170.

In one embodiment, all of the key-value pairs of the deduplication map level 166 are written into a persistent container (which also may be referred to as a "vector" herein). The vector represents all of the metadata updates for a given time range. Time in the storage system may be represented by a sequence (also referred to herein as sequence identifier). Each write to the back-end is given a unique, monotonic sequence. Since only writes can modify state, writes make a reasonable proxy for time. A vector, thus, contains all changes in state for a range of sequences. Vectors are conceptually stacked one atop another in sequence order. Newer sequence ranges placed atop older in the deduplication map pyramid 171.

When a query is generated for a key of some deduplication table in the deduplication map pyramid 171, the query starts at the top of the stack and asks each level in turn if the deduplication table associated with the level contains any information about that key. In such a manner, newer facts supersede older facts is ensured. A logical combining of levels may be referred to as a "merge". All of the vectors in a pyramid are merged to present a database. In one implementation, to maintain performance characteristics, a contiguous subset of vectors in a pyramid will occasionally be rewritten in a process referred to as "flattening." A range of vectors is chosen (which also represents a contiguous sequence range). A merge is created over the range of vectors. Thereupon, the chosen range of vectors is encoded into a new (single) vector, which represents a contiguous sequence range in the pyramid.

In one embodiment, deduplication map pyramid 171 represents the totality of deduplication map data of storage controller 155. Deduplication map pyramid 171 may be stored in storage resource 170. Deduplication map 163 may correspond to a portion 171A of deduplication map pyramid 171. Deduplication map 163 is illustrated as being stored in storage resource 170. In other implementations, some or all of deduplication map 163 may be stored in local memory 160. The portion 161A of index pyramid 161 corresponds to the portion 171A of deduplication map pyramid 171.

It may be noted that index summary 162 is illustrated as a portion 161A (e.g., shaded portion) of the index pyramid 161. The portion 161A of index pyramid 161, such as index summary 162, may be stored in local memory 160 while the index pyramid 161 (including portion 161A) may be stored in persistent storage resource 170. It may be noted that when storage controller 155 scales in size, the size of index summary 162 may remain relatively constant and the existing size of local memory 160 may also remain constant, thus saving clients from purchasing additional and expensive local memory 160. It may also be noted that deduplication map 163 may correspond to a portion 171A (e.g., shaded portion) of deduplication map pyramid 171. Deduplication map 163 is illustrated as being stored in local memory 160 while deduplication map pyramid 171 (including portion 171A) may be stored in persistent storage resource 170.

In one implementation, processing device 180 may execute the trimmer 190 to trim or otherwise delete no longer relevant deduplication entries in the deduplication map 163. In some implementations, the number of deduplication entries in the deduplication map 163 may exceed a threshold size that begins to adversely impact system performance. For example, as more data blocks 110 are received, the storage controller 155 may utilize any of the data deduplication technologies as discussed herein for reducing the amount of data stored in devices 175A-n. In some implementations, a data deduplication operation may be performed to remove duplicated portions of the data by using the deduplication map 163 to discover if the data block is already stored. As the deduplication map 163 grows in size, the searches for deduplication entries may become increasingly more expensive in terms of time to complete. Thus, the thinner the deduplication map 163 can be made, the better it may perform when it is used in the data deduplication process.

To thin out the deduplication map 163, the trimmer 190 may select a canonical instance of a data block, such as of data block 110. The canonical instance may be an earliest occurrence of the data block referenced in a particular vector of the deduplication map 163. The vector represents all of the updates to the deduplication map 163 for a given time range. After the canonical instance is selected, the trimmer 190 may identify each deduplication entry for the data block that is within the same vector and remaps each to point to the canonical instance. The trimmer 190 updates each deduplication entry pointing to the canonical instance in that vector with a tombstone 195. The tombstone 195 indicates that the deduplication entry is no longer needed.

Once the trimmer 190 detects that the tombstones 195 have reached the same sequence range in the deduplication map 163 as where the original data block 110 is located, the tombstones 195 can then be trimmed from the deduplication map 163. For example, the storage controller 155 may perform a "flattening" process on levels of the deduplication map 163 that in turn allows the tombstones 195 and the original metadata for the data object to hit the same level/vector and cancel each other out. This occurs before the tombstones 195 may reach an end of the deduplication map pyramid 171 associated with the deduplication map 163, which allows them to be trimmed earlier. In the meantime, any queries for the data block in the deduplication map 163 may be configured to filter out the tombstones 195 from any normal results.

The functionally of the trimmer 190 can exist in a fewer or greater number of components than what is shown, with such components residing at one or more processing devices of system 100, which may be geographically dispersed. In some embodiments, the trimmer 190 may be operable in conjunction with one or more components of the storage controller 155 from which it may receive and determine relevant information for data block in the persistent storage resource 170 for utilizing tombstones 195 to improve system performance as discussed in more detail below with respect to FIGS. 2A-2B.

Figure 2A:
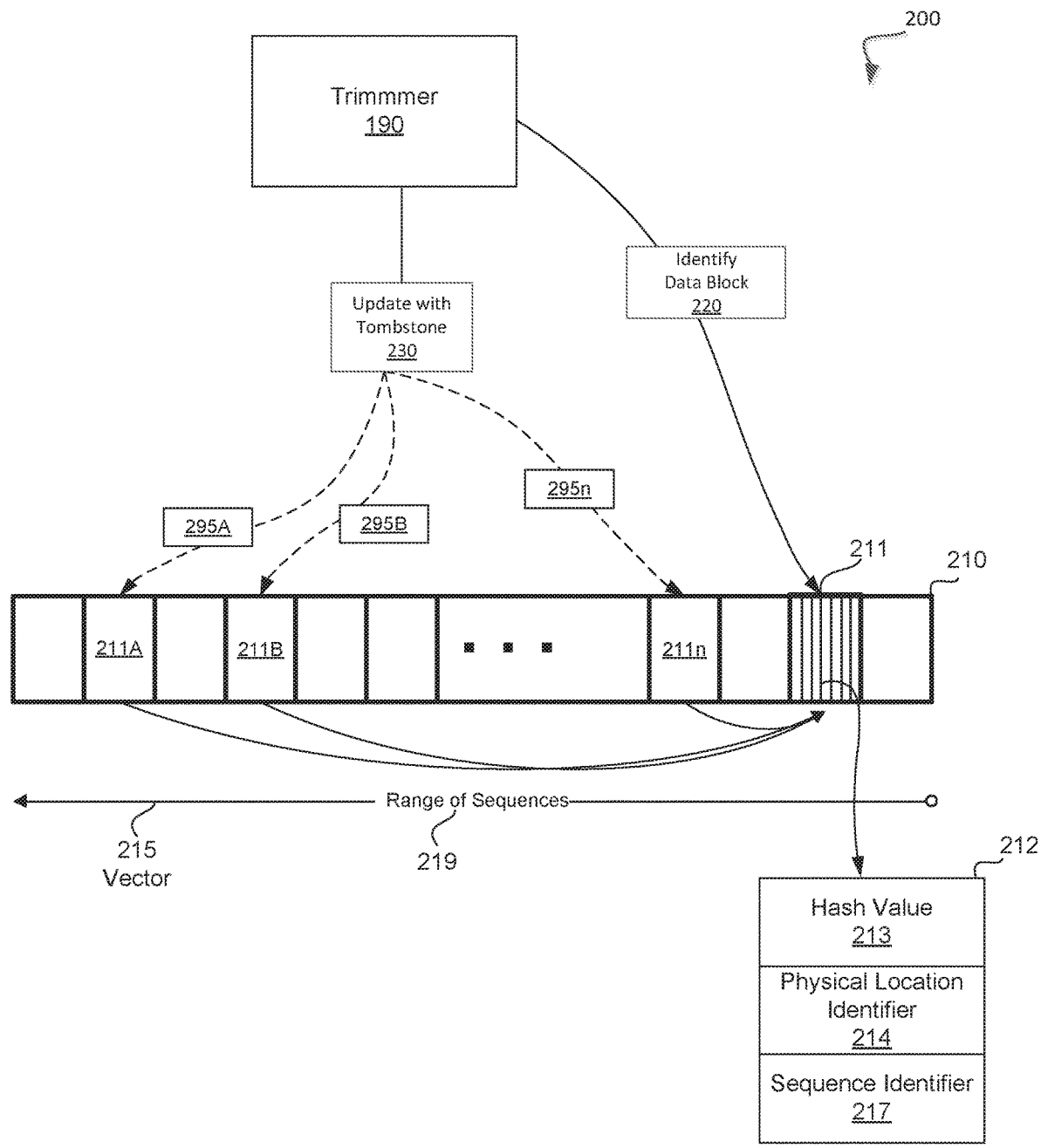
FIGS. 2A-2B illustrates an example use of tombstones in a system in accordance with some embodiments.

FIG. 2A illustrates an example use of tombstones, such as tombstones 195 of FIG. 1, in a system 200 in accordance with some embodiments. It may be noted that, for purposes of illustration, elements described with respect to FIG. 1 may be reference herein. In this example, system 200 includes the trimmer 190 of FIG. 1 and a data structure, such as a deduplication map level 210. In one implementation, the deduplication map level 210 may be stored in a persistent storage resource 170 (e.g., an SSD). The deduplication map level 210 may be a level in a pyramid structure for the deduplication map 163 used in a data deduplication process. In some implementations, the deduplication map level 220 may include multiple pages 211 that include multiple entries, such as entry 212. Each entry 212 includes a hash value 213, a physical location identifier 214 of a data block (e.g., data block 110) stored in persistent storage resource 170 and a sequence identifier 217 that represents a unique monotonic sequence identifier allocated to the entry 212 at a time it was written to the persistent storage resource 170.

In the data deduplication process, a data block 110 may be received to be stored at the persistent storage resource 170. In response to receiving the data block 110, the data deduplication process may be performed. The data deduplication process may perform a hash function on the data block 110 to generate a hash value, such as hash value 120. Using the hash value 120, the deduplication process may determine whether a copy of the data block has already been stored at the persistent storage resource 170. If the data block 110 is not stored at the persistent storage resource 170, the deduplication map level 220 may be updated or recreated to register the received data block 110. For example, an entry of the deduplication map level 210 may be created to include the hash value 120 of the data block 110 and a physical location identifier of the data block 110 in the persistent storage resource 170. If the data block 110 is already stored at the persistent storage resource 170, then an entry in the deduplication map level 210 may update with a pointer to a physical location of the copy of the data block 110.

In operation, the trimmer 190 of system 200 may use tombstones 295A-n to thin out no longer relevant entries in the deduplication map level 210. There may be entries in deduplicaton map level 210 where no other metadata in system references the data block because the metadata has been rewritten to point to the canonical copy of the block. In some implementations, the tombstones 295A-n may be a record consisting of a row of data in a database table. The tombstones 295A-n may include information indicating that the data block associated with the corresponding entry in the deduplication map level 210 is no longer referenced. The tombstones 295A-n may be used to replace entries in the vector 215 that are associated with a data block.

In some implementations, the trimmer 190 may identify a data block 220 associated with the deduplication map level 210. The data block 220 may represent a canonical instance of the data which is an earliest occurrence of the data block in a vector 215 for the deduplication map 163. For example, the deduplication map level 210 may be written into a persistent container, such as vector 215. The vector 215 contains all changes in a state of the deduplication map level 210 at the persistent storage resource 170 for a range of sequences 219 in a given time period. In one implementation, each write to the persistent storage resource 170 for an entry 211 of the deduplication map level 210 is given a unique monotonic sequence (e.g., sequence identifier 217) as a representation of a time the write occurred. Since only writes can modify state, writes make a reasonable proxy for time.

The trimmer 190 may select one or more deduplication references from the deduplication map level 210 that represents duplicate data of the identified data block 220. The deduplication references may be in one or more entries, such as entries 211A-n of the deduplication map level 210. To select entries 211A-n, the trimmer 190 may determine whether a hash value associated with the deduplication references and the target data block 220 matches each other or otherwise correspond. The trimmer 190 may update the entries 211A-n to point to the identified data block 220 which represents a canonical instance of the data associated with the data block. After selecting the entries 211A-n in the vector 215 for the deduplication references for the target, the trimmer 190 may update each entry with a tombstone, such as tombstones 295A-n. The tombstones 295A-n indicates that the entry is no longer relevant and can be trimmed from the deduplication map level 210.

Figure 2B:
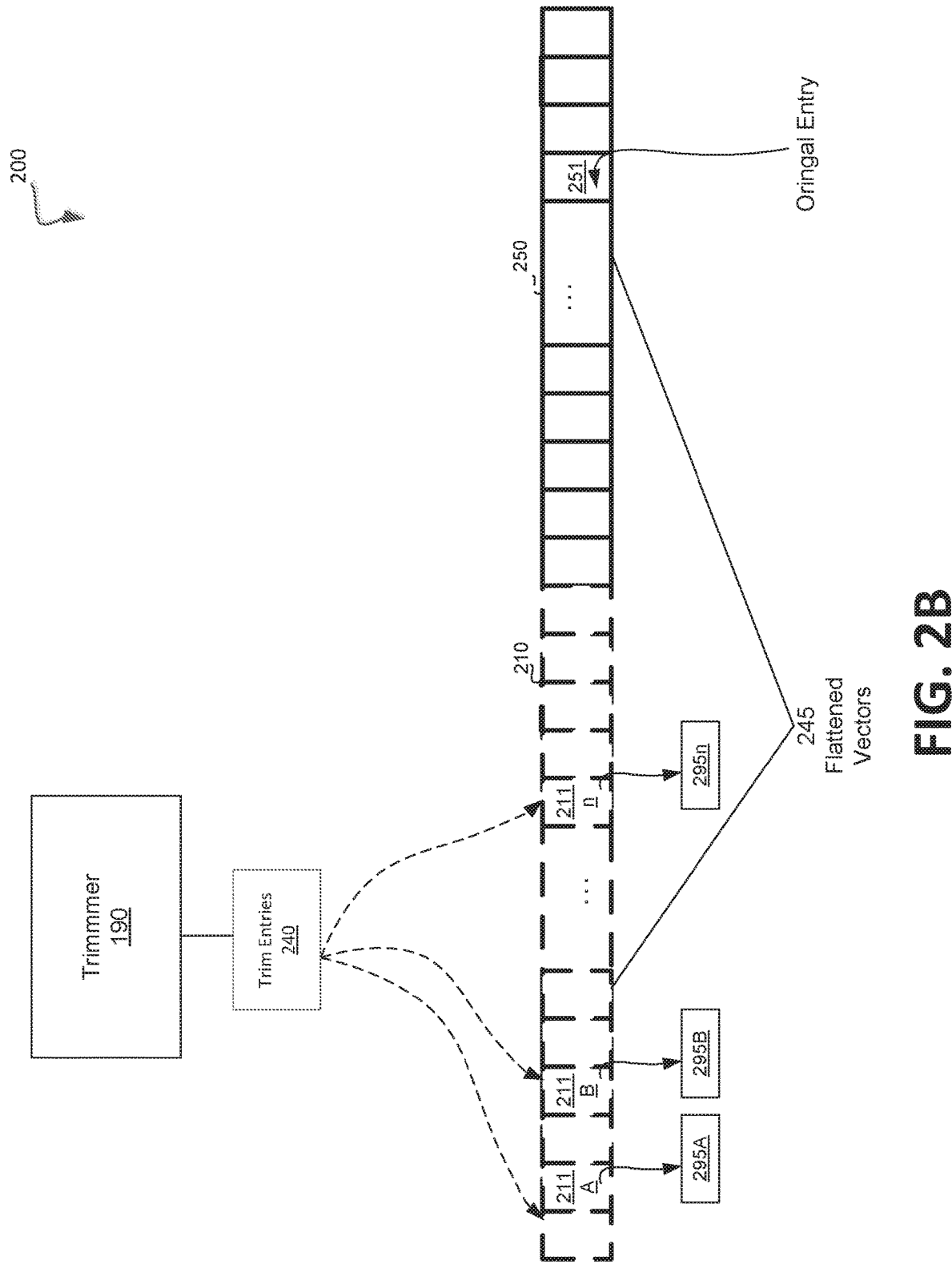

Turning to FIG. 2B, the storage controller 155 may execute a flattening process to flatten vectors 245 (e.g., merge) associated with the deduplication map. For example, the deduplication map level 210 (which is represented by vector 215) may be merged with a second deduplication map level 250 (which is represented by different vector). The flattened vectors 245 are rewritten into a new (single) vector that represents a contiguous sequence range. In some implementations, this flattening process may continue over and over again. Due to the flattening process at some point, the tombstones 295A-n may reach a level corresponds to an original entry 251 of the data block. This may occur before the tombstones 295A-n reach the last vector range associated with the deduplication map pyramid 171. For example, the trimmer 190 may detect that the sequences for the entries associated with the tombstones 295A-n correspond a sequence range of the original entry 251 in the deduplication map pyramid 171.

Upon the tombstones 295A-n reaching a level associated with the original entry, the trimmer 190 may then execute a trim entries instruction 240 to thin out the deduplication map level 210 by trimming or otherwise deleting the entries 211A-n in the flattened vectors 245 associated with tombstones 295A-n. In turn, this thinning out of the deduplication map helps improve performance of the data deduplication process when it uses the map for another received data block that is a duplicate for the data block.

Figure 3:
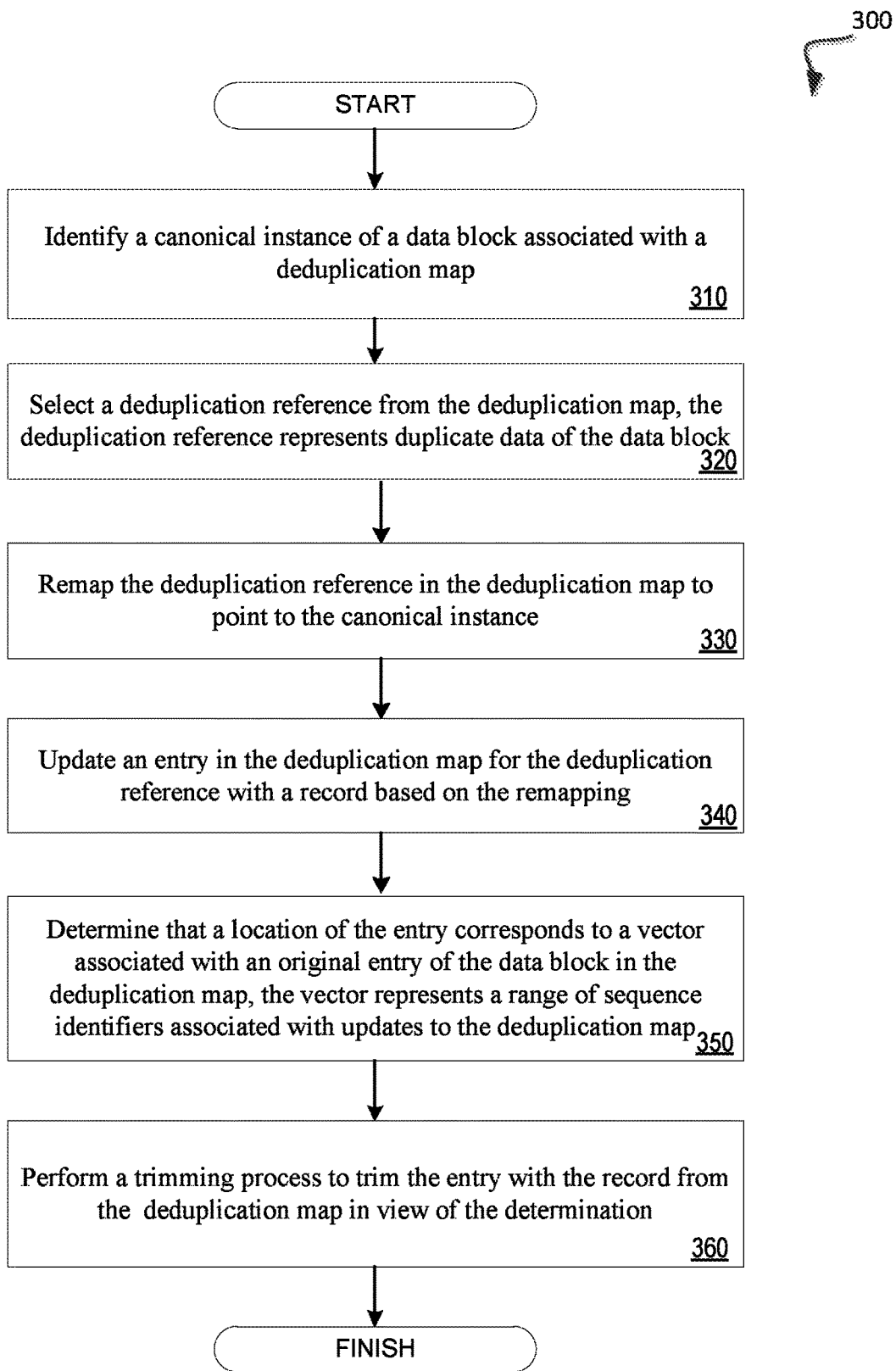
FIG. 3 illustrates an example method of providing tombstones for no longer relevant deduplication entries in accordance with some embodiments.

FIG. 3 illustrates an example method 300 of providing tombstones for no longer relevant deduplication entries in accordance with some embodiments. The method 300 may be performed by processing logic that comprises hardware (e.g., circuitry, dedicated logic, programmable logic, microcode, etc.), software (e.g., instructions run on a processing device to perform hardware simulation), firmware, or a combination thereof. In one embodiment, one or more processors of the computer device executing the method 300 may perform routines, subroutines, or operations of method 300 and each of its individual functions. For example, processing device 180 executing trimmer 190 as shown in FIG. 1 may perform method 300. It should be noted that blocks of method 300 depicted in FIG. 3 can be performed simultaneously or in a different order than that depicted.

Referring to FIG. 3, at block 310, method 300 identifies a canonical instance 212 of a data block 211 associated with a deduplication map 210, for example, in a storage array 175. At block 320, a deduplication reference 211A is selected from the deduplication map 210. The deduplication reference 211A represents duplicate data of the data block 211. At block 330, the deduplication reference 211A in the deduplication map 210 is remapped to point to the canonical instance 212. At block 340, an entry in the deduplication map for the deduplication reference 211A is updated with a record based on the remapping. At block 350, it is determined that a location of an entry corresponds to a vector 245 associated with an original entry 251 of the data block in the deduplication map 210,250. The vector 215 represents a range of sequence identifiers 219 associated with updates to the deduplication map 210. In view of the determination, at block 340 a trimming process 240 is performed to trim the entry with the record from the deduplication map 210,250.

Figure 4:
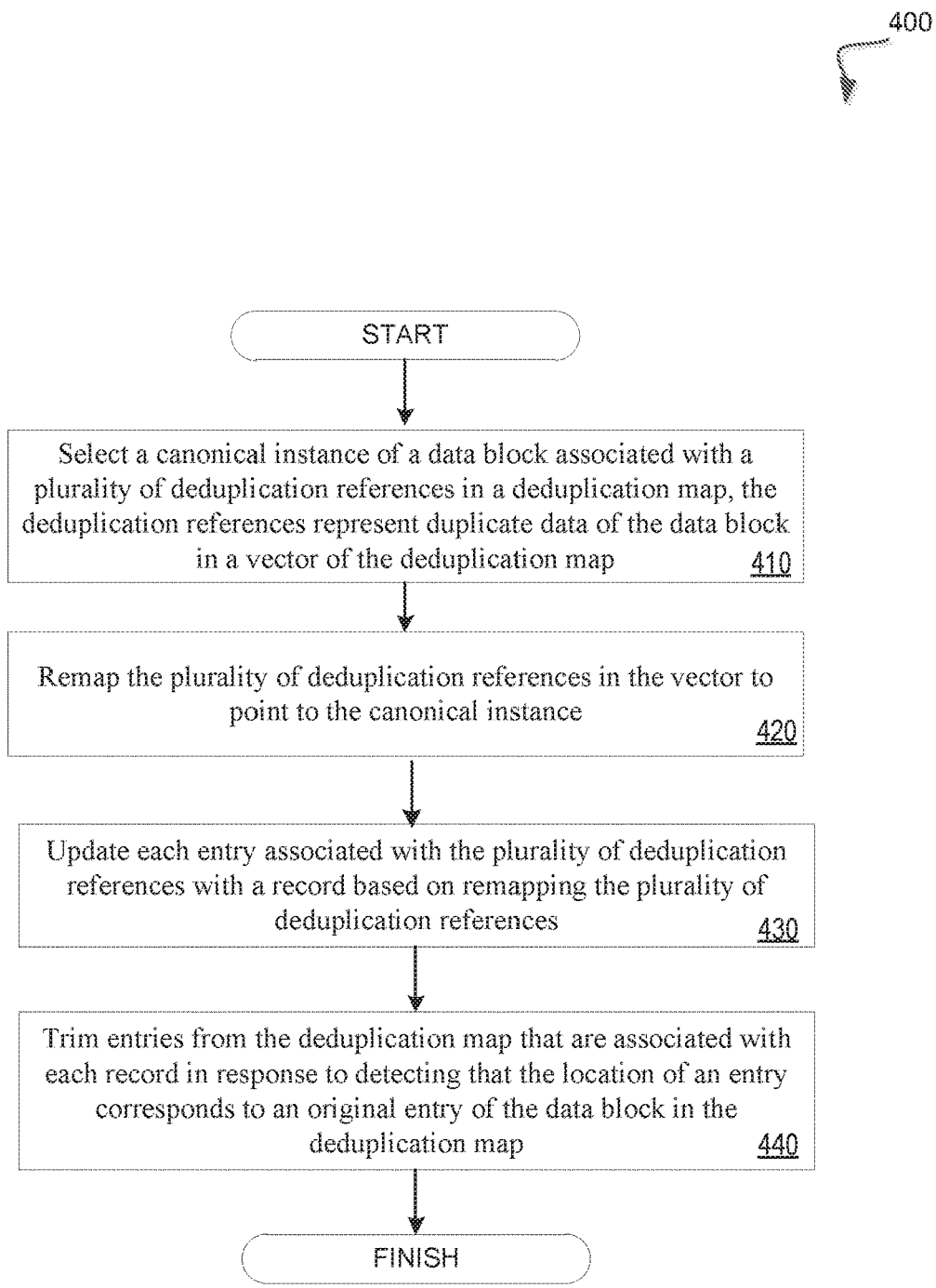
FIG. 4 illustrates an example method of using tombstones to trim no longer relevant deduplication entries from a database in accordance with some embodiments.

FIG. 4 illustrates an example method 400 of using tombstones to trim no longer relevant deduplication entries from a database in accordance with some embodiments. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. In one embodiment, one or more processors of the computer device executing the method 400 may perform routines, subroutines, or operations of method 400 and each of its individual functions. For example, processing device 180 executing trimmer 190 as shown in FIG. 1 may perform method 400. It should be noted that blocks of method 400 depicted in FIG. 4 can be performed simultaneously or in a different order than that depicted.

Referring to FIG. 4, at block 410, method 400 selects a canonical instance of a data block 211 associated with a plurality of deduplication references 211A-n in a deduplication map 210. The deduplication references 211A-n represent duplicate data of the data block 211 in a vector 215 of the deduplication map 210. At block 420, the plurality of deduplication references in the vector are remapped to point to the canonical instance. At block 430, each entry associated with the plurality of deduplication references 211A-n is updated with a record 295A-n. At block 440, trim entries from the deduplication map that are associated with each record 295A-n in response to detecting that the location of the entry corresponds to an original entry 212 of the data block in the deduplication map 250.

Figure 5:
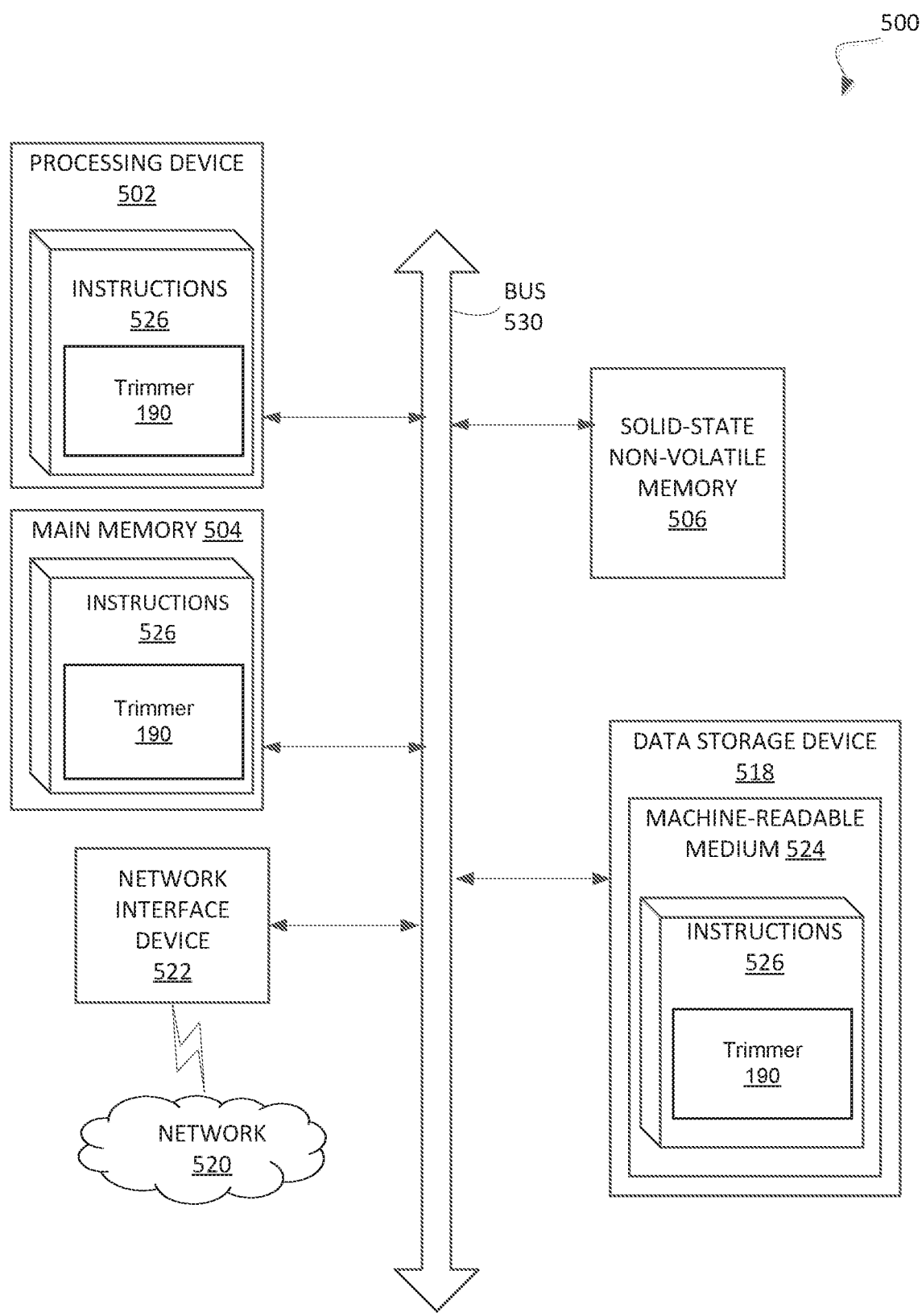
FIG. 5 illustrates an example computer system operating in accordance with some embodiments.

FIG. 5 illustrates an example computer system 500 which can perform any one or more of the methods described herein. The computer system 500 may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a solid-state non-volatile memory 506 (e.g., flash memory, 3D crosspoint memory, magnetoresistive random-access memory (MRAM), or any other such storage media that does not use a physical disk), and a data storage device 518, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The processing device 502 is configured to execute trimmer 190 for performing any of operations and steps as discussed herein. The computer system 500 may further include a network interface device 522. The data storage device 518 may include a computer-readable medium 524 on which is stored the component 520 embodying any one or more of the methodologies or functions described herein. The component 520 may also reside, completely or at least partially, within the main memory 504 and/or within the processing device 502 during execution thereof by the computer system 500, the main memory 504 and the processing device 502 also constituting computer-readable media. The component 520 may further be transmitted or received over a network via the network interface device 522.

While the computer-readable storage medium 524 is shown in the illustrative examples to be a single medium, the term "computer-readable storage medium" (e.g., "non-transitory computer-readable storage medium") may be taken to include a single medium or multiple media (e.g., a centralized or distributed database, and/or associated caches and servers) that store the one or more sets of instructions 526. The term "computer-readable storage medium" shall accordingly be taken to include, but not be limited to, solid-state memories, optical media, and magnetic media.

The term "computer-readable storage medium" shall also be taken to include any medium that is capable of storing, encoding or carrying a set of instructions 526 for execution by the machine and that cause the machine to perform any one or more of the methodologies of the present disclosure, including instructions for implementing method 300 of FIG. 3 or method 400 of FIG. 4. The instructions 526 may also reside, completely or partially, within main memory 504 and/or within processing device 502 during execution thereof by computer system 500, hence, main memory 504 and processing device 502 may also constitute machine-readable storage media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure may, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "performing," "selecting," "remapping," "updating," "trimming," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any method for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A system comprising:
    a storage array comprising a plurality of data blocks; and
    a storage controller coupled to the storage array, the storage controller comprising a processing device, the processing device to:
        identify a canonical instance of a data block in a vector associated with a deduplication map, the vector represents a plurality of updates to the deduplication map over a determined time period;
        select, from the deduplication map, a deduplication reference representing duplicate data of the data block in the storage array, wherein the canonical instance represents an earliest occurrence of the duplicate data of the data block in the vector associated with the deduplication map;
        remap the deduplication reference in the deduplication map to point to the canonical instance;
        update an entry in the deduplication map for the deduplication reference with a record based on the remapped the deduplication reference; and
        responsive to detecting that the entry is in a location associated with an original entry of the data block in the deduplication map, delete the entry with the record.

2. The system of claim 1, wherein to determine the vector, the processing device is further to determine a range of sequence identifiers associated with a plurality of updates to the data block.

3. The system of claim 2, wherein to determine whether the deduplication reference is in the vector, the processing device is further to:
identify a sequence identifier for the deduplication reference; and
determine whether the sequence identifier is within the range of sequence identifiers associated with the vector.

4. The system of claim 3, wherein the processing device is further to determine whether the identify sequence identifier for the deduplication reference corresponds to a sequence identifier for the data block.

5. The system of claim 4, wherein the processing device is further to, responsive to determining that the identified sequence identifier corresponds to a sequence identifier for the data block, delete the entry associated with the record from the deduplication map.

6. The system of claim 1, wherein, the processing device is further to determine whether a hash value associated with the deduplication reference and the data block correspond.

7. A method comprising:
identifying, by a processing device, a canonical instance of a data block associated with a deduplication map;
selecting, by the processing device, a deduplication reference from the deduplication map, the deduplication reference represents duplicate data of the data block, wherein the canonical instance represents an earliest occurrence of the duplicate data of the data block in an identified vector for the deduplication map;
remaping the deduplication reference in the deduplication map to point to the canonical instance;
update an entry in the deduplication map for the deduplication reference with a record based on the remaping;
determining, by the processing device, that a location of the entry corresponds to a vector associated with an original entry of the data block in the deduplication map, the vector represents a range of sequence identifiers associated with updates to the deduplication map; and
performing, in view of the determining, a trimming process to trim the entry with the record from the deduplication map.

8. The method of claim 7, wherein determining that the location of the deduplication reference corresponds to the vector:
identifying a sequence identifier for the deduplication reference; and
determining whether the sequence identifier is within the range of sequence identifiers associated with the vector.

9. The method of claim 8, further comprising determining whether the identify sequence identifier for the deduplication reference corresponds to a sequence identifier associated with an original entry for the data block in the deduplication map.

10. The method of claim 9, wherein responsive to determining that the identify sequence corresponds to a sequence identifier for the original entry, issuing an instruction to trim the record from the deduplication map.

11. The method of claim 7, wherein the selecting comprises determining whether a hash value in the deduplication map for the deduplication reference and the data block correspond.

12. A non-transitory computer readable storage medium storing instructions, which when executed, cause a processing device to:
select, by the processing device, a canonical instance for a data block associated with a plurality of deduplication references in a deduplication map, the deduplication references represent duplicate data of the data block in a vector of the deduplication map;
remap the plurality of deduplication references in the vector to point to the canonical instance, wherein the canonical instance represents an earliest occurrence of the duplicate data of the data block in an identified vector for the deduplication map;
update each entry associated with the plurality of deduplication references with a record based on remapping the plurality of deduplication references; and
responsive to detecting that the location of an entry corresponds to an original entry of the data block in the deduplication map, trim entries from the deduplication map that are associated with each record.

13. The non-transitory computer readable storage medium of claim 12, wherein the processing device is further to identify the vector associated with the plurality of deduplication references based on a sequence identifier for the canonical instance.

14. The non-transitory computer readable storage medium of claim 12, wherein the vector comprises a range of sequence identifiers associated with updates to the data block.

15. The non-transitory computer readable storage medium of claim 14, wherein the processing device is further to:
identify a sequence identifier for each of the deduplication references; and
determine whether the sequence identifier is within the range of sequence identifiers associated with the vector.

16. The non-transitory computer readable storage medium of claim 15, wherein the processing device is further to determine whether at least one of the identify sequence identifier for each of the deduplication references corresponds to a sequence identifier for the original entry associated with the data block.

17. The non-transitory computer readable storage medium of claim 12, wherein the processing device is further to determine whether a hash value for each of the deduplication references in the deduplication and the data block correspond.

* * * * *